Oct. 28, 1969     E. BUSCH     3,475,087

FILM PROJECTION APPARATUS

Filed Feb. 9, 1966     2 Sheets-Sheet 1

INVENTOR.
EDWIN BUSCH
BY
Learman, Learman & McCulloch
ATTORNEYS

Oct. 28, 1969  E. BUSCH  3,475,087
FILM PROJECTION APPARATUS

Filed Feb. 9, 1966  2 Sheets-Sheet 2

INVENTOR.
EDWIN BUSCH
BY
Learman, Learman & McCulloch
ATTORNEYS 3,475,087
FILM PROJECTION APPARATUS
Edwin Busch, 1815 Seminole, Saginaw, Mich. 48603
Filed Feb. 9, 1966, Ser. No. 526,215
Int. Cl. G03b 21/10, 21/24
U.S. Cl. 352—104                                    5 Claims

ABSTRACT OF THE DISCLOSURE

Apparatus for displaying an image from a film projector comprises a triangular housing into which may be projected a light beam from a film projector, the beam entering the housing between its upper and lower ends. Within the housing are three reflectors, the first of which is arranged to reflect the incoming light beam toward the bottom of the housing, the second reflector being arranged to reflect the beam toward the upper part of the housing and the third reflector being arranged to reflect the beam through a screen that is supported by the housing. The length of the path traveled by the light beam corresponds to the distance prescribed for displaying an image from a lens of predetermined diameter.

---

This invention relates to apparatus for projecting or displaying motion picture or still films and more particularly to projection apparatus that is so constructed as to enable the optimum size image to be displayed on a screen without requiring the projector and screen to be spaced physically from one another the distance normally required to obtain an image of such size.

It is conventional practice to provide classrooms, lecture rooms, exhibition rooms, and the like, with a rolled projection screen which may be unrolled when desired so as to enable a conventional slide or motion picture projector to display a film on such screen. In utilizing such apparatus, it is conventional to place the projector on a table or other support in the room at a predetermined distance from the screen so as to enable the optimum size image to be displayed on the screen. In such an arrangement, the light beam emitted from the projector travels directly to the screen, frequently necessitating the clearing of those seats between the projector and the screen. In addition, space must be provided for the storage of the projector and the table or other support on which it must be mounted when in use.

An object of this invention is to provide a self-contained film display unit which may form a permanent part of a class or other room and in which the optimum size image may be displayed without necessitating separation of the projector and screen the distance normally required for projection of the optimum size image.

Another object of the invention is to provide apparatus of the character described and wherein the use of the apparatus does not result in the loss of any seating capacity.

A further object of the invention is to provide film projection apparatus of the kind referred to and which is contained in a substantially triangularly shaped structure for accommodation in a corner of a room so as to enable all of the occupants of the room to see easily the projected image.

Other objects and advantages of the invention will be pointed out specifically or will become apparent from the following description when it is considered in conjunction with the appended claims and the accompanying drawings, in which:

Figure 2:
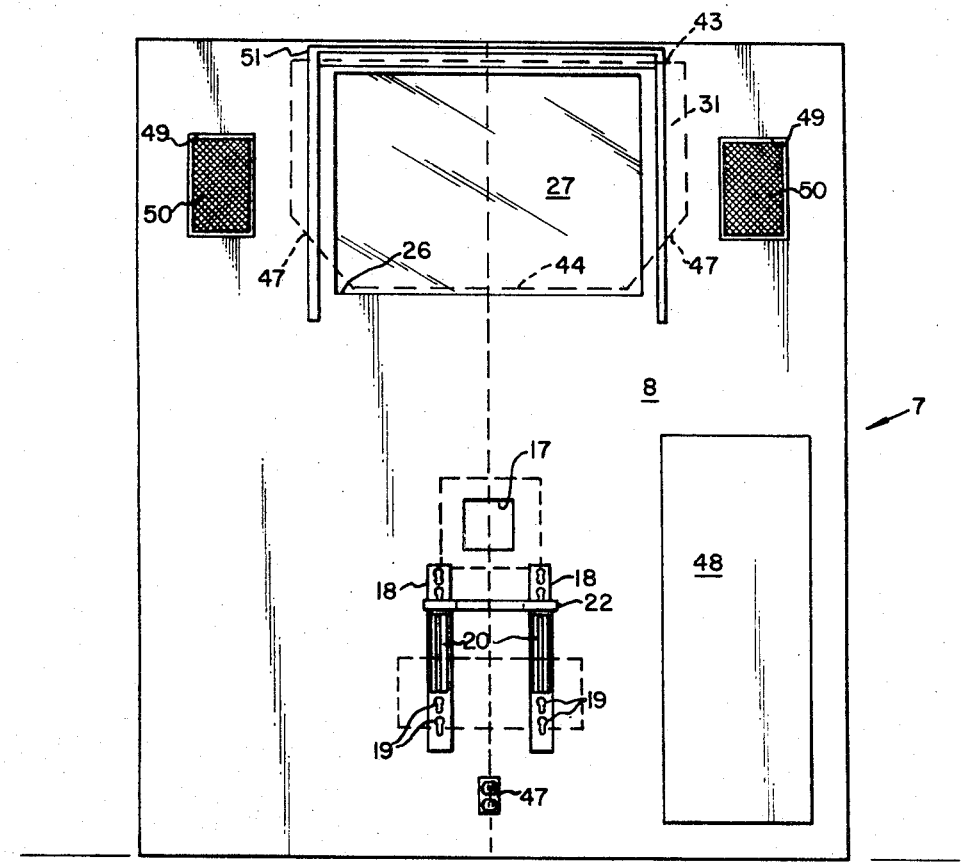
FIGURE 2 is an enlarged front elevational view of the projection apparatus.
Figure 1:
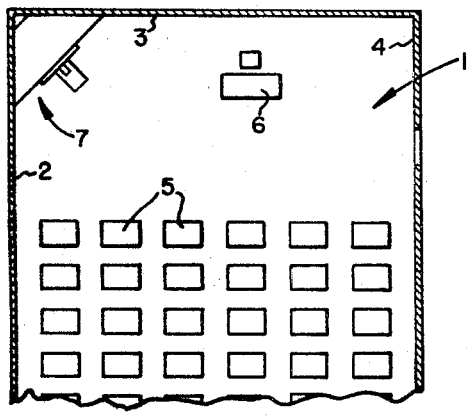
FIGURE 1 is a fragmentary plan view, on a reduced scale, of a typical classroom equipped with apparatus constructed in accordance with the invention.
Figure 4:
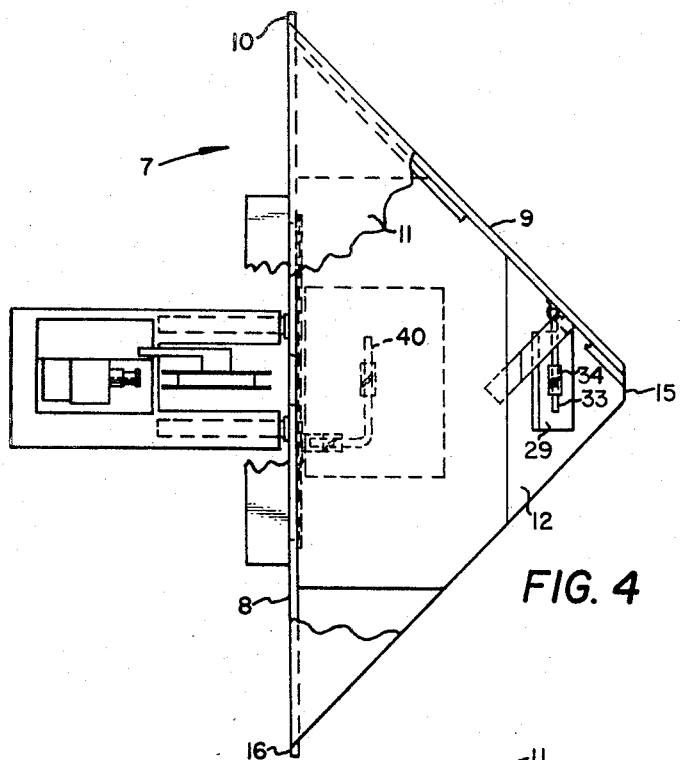
FIGURE 4 is a top plan view with parts broken away for clarity.
Figure 3:
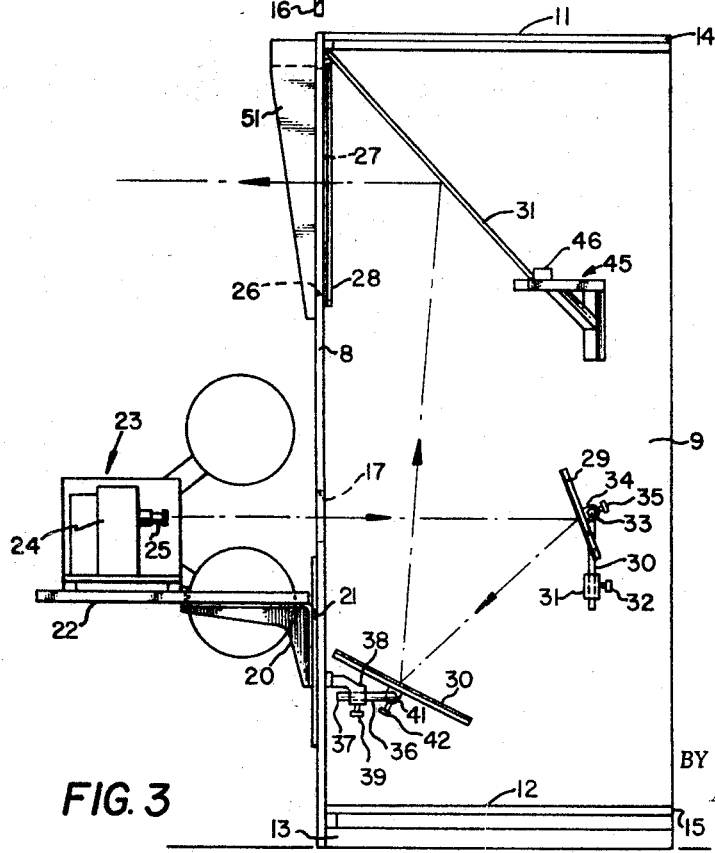
FIGURE 3 is a side elevational view.

Apparatus constructed in accordance with the invention is disclosed as being located within a classroom 1 having vertical walls 2, 3, and 4 forming an enclosure for a plurality of pupils' desks 5 and a teacher's desk 6. Two of the walls 2 and 3 join one another at the front of the classroom to provide a substantially right angle corner in which a housing or cabinet 7 constructed in accordance with the invention is positioned.

The cabinet 7 comprises a vertical front wall 8 adjacent one edge of which is secured one end of a side wall 9 which extends at an angle of substantially 45 degrees to the front wall 8. The edge of the wall 8 projects slightly beyond the wall 9 to provide a short flange 10 for a purpose presently to be described. Joined to the walls 8 and 9 are top and bottom walls 11 and 12, respectively, and to the bottom wall 12 is secured a number of base members 13 which are adapted to rest upon the floor of the room 1. It is not necessary to provide a third wall to adjoin the walls 8 and 9, although such a wall may be included if desired.

The top and bottom walls 12 are not truly triangular, but are provided with planar edges 14 and 15, respectively, parallel to the plane of the front wall 8. The edge of the front wall 8 opposite the flange 10 also includes a flange 16 which projects beyond the confines of the top and bottom walls. The purpose of the flanges 10 and 16 and the planar surfaces 14 and 15 is to enable the cabinet 7 to be positioned in the corner of a room 1 with the flanges 10 and 16 fitting snugly against the walls 2 and 3, respectively, even though those walls may not be truly normal to each other. The front wall 8 thus extends obliquely to each of the room walls 2 and 3 and is clearly visible to the occupant of each desk 5 and 6.

The front wall 8 of the cabinet 7 is provided with an opening 17 therein. Adjacent the opening is mounted a pair of supporting strips 18 each of which is provided with a plurality of keyhole slots 19. A pair of right-angular brackets 20 having studs 21 thereon is adapted to be mounted adjustably on the supporting strips 18. Secured to the brackets 20 is a shelf 22 on which a conventional film projector 23 may be supported.

The projector 23 may have an electric light bulb (not shown) or other light source of appropriate wattage mounted within a housing 24 and arranged to emit a light beam through a standard one inch lens assembly 25. The projector 23 should be so supported on the wall 8 that the light beam passes into the interior of the cabinet 7 through the opening 17.

Above the opening 17 the wall 8 is provided with another, larger opening 26 in which is accommodated a translucent, but not transparent, screen 27. Suitable frame members 28 are provided on the inner surface of the wall 8 to support the screen 27.

The screen 27 is rectangular in configuration and has an area that is so related to the lens diameter of the assembly 25 and the wattage of the light source as to provide the optimum image size when the lens is at the optimum predetermined distance from the screen 27. For example, if the diameter of the lens 25 is the standard one inch and the lamp has a rating of 500 watts, as is conventional in classroom motion picture projectors, the area of the screen 27 should be approximately one thousand square inches.

Means is provided within the housing 7 to intercept the light beam emitted from the projector 23 and reflect it along successive paths leading to the rear of the screen 27, the arrangement being such that the combined length of the paths traversed by the beam corresponds to the optimum distance from the lens to the screen for producing the optimum size image on the screen. In the disclosed embodiment, the desired result is achieved by the use of three reflecting mirrors 29, 30 and 31. The mirror 29 is mounted on an L-shaped bracket having one arm 30 that is adjustably mounted in a tubular support 31 fixed to the wall 9. A locking screw 32 acts on the arm 30 to maintain the latter in any selected position of adjustment. The bracket also includes a second arm 33 which extends through a tubular support 34 fixed to the back of the mirror 29. A set screw 35 acts on the arm 33 to maintain the mirror 29 in a selected position of adjustment.

The mirror 30 is mounted on an L-shaped bracket 36 having one arm 37 extending through a tubular support 38 that is mounted on the inner surface of the wall 8. A set screw 39 acts on the arm 37 to maintain the bracket 36 in a desired position of adjustment. The bracket 36 includes a second arm 40 which passes through a tubular support 41 fixed to the back of the mirror 30 which is provided with a set screw 42 for maintaining the mirror 30 in a desired position of adjustment.

The mirror 31 has a planar upper edge 43 which may rest against the inner surface of the wall 8 and has a lower, parallel edge 44 which may rest upon a bracket 45 screwed or otherwise secured to the wall 9. A stop 46 is provided on the bracket 45 against which the lower edge 44 of the mirror 31 may rest. The side edges of the mirror 31 are cut away adjacent their lower edges as at 47 so as not to project beyond the confines of the housing 7.

The mirror 30 has an area greater than that of the mirror 29, but less than the area of the mirror 31. The areas of the respective mirrors are so selected as to assure substantially full illumination of the screen by the beam reflected by the mirrors.

The mirrors 29, 30 and 31 are so arranged that the mirror 29 reflects the beam emitted from the lens 25 to the mirror 30. The mirror 30 reflects the beam to the mirror 31, whence the beam is reflected to the screen 27 along a path normal to the plane of the screen. The combined distances from the lens 25 to the mirror 29, from the mirror 29 to the mirror 30, from the mirror 30 to the mirror 31, and from the mirror 31 to the screen 27 corresponds to the distance prescribed for displaying an image having an area corresponding to the area of the screen 27 from a lens having the diameter of the lens 25. Thus, even though the actual distance between the projector and the screen is much less than the prescribed distance for projection of an image, the length of the beam path corresponds to such distance.

Although a motion picture projector has been illustrated, it will be understood that the apparatus is equally adapted for use with a slide or still picture projector. The lenses of slide projectors normally are not located at the same height as the lenses of motion picture projectors, but the adjustability of the mounting brackets 20 will enable the slide projector to be located at the proper height.

Preferably, the front wall 8 has an electrical outlet 47 provided adjacent its lower end and from which wires (not shown) may extend to a source of electrical energy. The housing 7 also preferably has a door 48 therein which may be utilized to gain access to the interior of the housing for adjustment of the mirrors or for storing the projector therein.

If desired, openings 49 may be provided in the front wall 8 for reception of loud-speaker units 50 of conventional costruction. In addition, the opening 36 may be framed by a conventional keystone effect eliminator 51 in which may be stored a conventional rolled screen for those instances where it is desired to use a projector in a conventional manner from some location within the room 1.

The disclosed embodiment is representative of the presently preferred form of the invention, but is intended to be illustrative rather than definitive thereof. The invention is defined in the claims.

I claim:
1. Apparatus for displaying an image from a film projector, said apparatus comprising an upright, walled housing having top and bottom ends and front and rear sides; mounting means at a level between the top and bottom ends of said housing for supporting a film projector adjacent the front side of said housing in substantially horizontal position to enable said projector to project a substantially horizontal beam toward the rear side of said housing; first reflector means mounted in said housing adjacent the rear side thereof and between the top and bottom ends of said housing for receiving said substantially horizontal beam and reflecting it obliquely toward the bottom end and the front side of said housing; second reflector means having a larger area than that of said first reflector means and mounted in said housing in a position to receive the beam reflected from said first reflector means and reflect it toward the top end of said housing and beyond the level of said mounting means; third reflector means having a larger area than that of said second reflector means and mounted in said housing in a position to receive the beam reflected by said second reflector means and reflect it substantially horizontally toward said front side of said housing; and a screen member supported adjacent the upper end of said housing and at said front side thereof in a position to receive the beam reflected by said third reflector means.

2. Apparatus as set forth in claim 1 wherein said mounting means is external of said housing and said front side of the latter has an opening therein through which said beam from the projector may pass.

3. Apparatus as set forth in claim 1 wherein said mounting means, said reflector means and said screen member are so positioned relatively to one another that the combined distance traversed by said beam from the projector to the screen member corresponds to the distance required to produce the optimum size image on said screen member.

4. Apparatus as set forth in claim 1 wherein said housing is substantially triangular in plan, the front side of said housing constituting one side of the triangle.

5. Apparatus as set forth in claim 4 wherein said third reflector means has sides which converge toward the rear side of said housing.

References Cited
UNITED STATES PATENTS

| | | |
|---|---|---|
| 1,153,685 | 9/1915 | Guerzoni et al. |
| 2,485,709 | 10/1949 | Davock. |
| 2,633,774 | 4/1953 | Rounsefell. |
| 2,782,680 | 2/1957 | Howell. |
| 3,051,040 | 8/1962 | Davis. |

FOREIGN PATENTS

| | | |
|---|---|---|
| 681,445 | 10/1952 | Great Britain. |

JULIA E. COINER, Primary Examiner

U.S. Cl. X.R.

353—79